Oct. 17, 1961  M. WATTER  3,005,086
JOINING METHODS
Filed April 16, 1959

INVENTOR
Michael Watter.
BY
ATTORNEY

United States Patent Office 3,005,086
Patented Oct. 17, 1961

3,005,086
JOINING METHODS
Michael Watter, Philadelphia, Pa., assignor to The Budd Company, Philadelphia, Pa., a corporation of Pennsylvania
Filed Apr. 16, 1959, Ser. No. 806,812
2 Claims. (Cl. 219—85)

This invention pertains to thermal joining methods and more particularly to such methods as adapted for the joining of sheet metal components which are substantially divergent except for narrow faying surfaces.

In many types of sheet metal structures successful fabrication depends upon the properties of attachments between components along narrow contact areas, faying surfaces, the major surfaces of the components being substantially mutually divergent. An important example is in the fabrication of sheet metal sandwich structures which comprise corrugated core components joined to each other and to planar skin sheets. Here, the faying surfaces are elongated narrow areas between substantially cylindrical surfaces or are between a substantially cylindrical surface and a substantially plane surface.

For those applications of such structures where maximum strength attachments are required, it has been conventional to employ autogenous welds wherein a portion of the parent metal of each component is fused, melted, and thereafter solidified into a weld nugget bond. These welds are repeated at intervals along the faying surfaces or, alternatively, may be in the form of longitudinal seam welds. The spot or seam weld attachments have excellent tangential properties so that any eventual failure is due primarily to fatigue, flexural loading, or to other non-tangential loadings with respect to the faying surfaces.

To improve the fatigue strength and flexural stability of such structural attachments it has been found desirable in the past to increase the transverse dimension of the weld nugget bonds. The transverse dimensions are restricted, however, by the narrow faying surfaces. Further, for any increase in the lateral area of the weld nugget, there is a related increase in the penetration of the weld nugget into the sheet material components. In many cases, increased penetration must be avoided and, therefore, also results in limitation of the maximum nugget size.

Therefore, it is an object of this invention to provide a method for making improved strength attachments for joining sheet metal structure components at narrow faying surfaces.

A more specific object is to provide an improved method of joining sheet metal components at narrow faying surfaces, which method employs conventional welding apparatus in a single operation at each attachment position and yields attachments of improved fatigue strength and resistance to flexure of the components.

According to illustrated embodiments of this invention, the above, and other objects and advantages, hereinafter apparent, are provided for by forming, concurrently with the formation of autogenous welds at narrow faying surfaces between sheet metal components, a brazed fillet by fusion of a layer of braze metal previously interposed between the components in the vicinity of each attachment position.

A better understanding of this invention, however, will be had upon consideration of the following explanation in conjunction with the drawing wherein.

Figure 1:
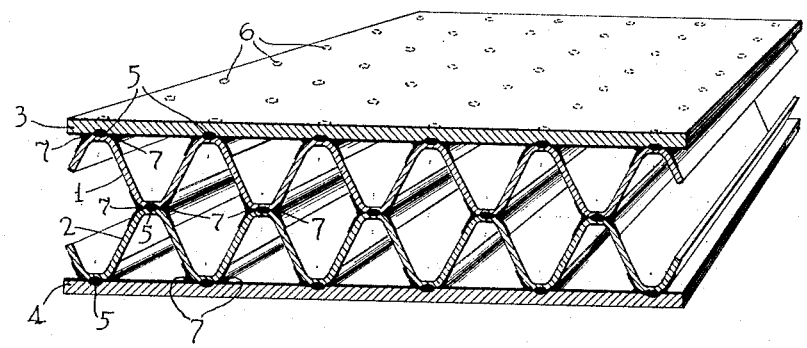
FIGURE 1 illustrates a sheet metal sandwich structure formed in accordance with this invention.

With reference to FIGURE 1, a conventional sandwich structure comprises corrugated core components 1, 2 and planar skins 3, 4 all of a sheet material, for example; stainless steel. This particular structure is known as an integrated core panel and is especially applicable to airfoils and the like, where a high strength to weight ratio is important. The structural properties of the panel depend, however, upon the attachments provided at the several faying surfaces between pairs of components. Conventionally, the attachments consist of bonds formed by autogenous weld nuggets 5 repeated at a plurality of attachment positions indicated by the dashed circles 6 along the faying surfaces.

According to this invention, however, fillets 7 of a brazed material are also provided in the vicinity of the faying surfaces at the attachment positions. The fillets 7 cause a lessening of any stress gradient across the joints, damp any vibrational loading thereof, and react in compression and tension over an increased juncture area to relative flexure of the joined components. The composite attachments greatly increase the strength, stability, and fatigue resistance of the joints and, therefore, of the entire structure.

Contrary to the prior art teachings, applicant has discovered that interposition of a lower fusion temperature braze material between sheet metal components at attachment positions before heating allows concurrent formation of both an autogenous weld and a brazed fillet attachment during a single operation of autogenous welding apparatus. The braze materials, copper for example, generally have a higher thermal conductivity, concomitant with their lower melting power, relative to structural materials. However, the expected heat dispersion has not been found to be significant. An applicable theory is that the areal time-temperature relationship produced by thermal energy dissipation at an attachment position is such as to first fuse a portion of the brazing material and, thereafter, to fuse generally hemispheric volumes of the parent metal of each of the structural components.

The expected corollary to this theory would be that deleterious mixing of the parent material and the foreign brazing material would reduce, rather than enhance, desirable properties of the composite attachment. Actually, however, applicant has determined that when a normal pressure is maintained across an attachment position during heating, significant mixing of the materials is prevented by expulsion of the brazing material from the eventual position of the weld nugget before fusion of the weld nugget volume. This is due, primarily, to a sharp rise in the temperature gradient at the weld nugget position. This temperature gradient peak at the center of the heated area is sharpened, as the braze material fuses and is expelled, so that the process is regenerative and the expulsion extremely rapid.

The continuation of the usual normal force or so-called back up pressure urging the structural components together effects contact of the components after displacement of the braze metal and during weld nugget formation. When heating is subsequently interrupted the weld nugget solidifies first and then the fused brazing material solidifies, as its temperature is subsequently reduced.

Figure 2:
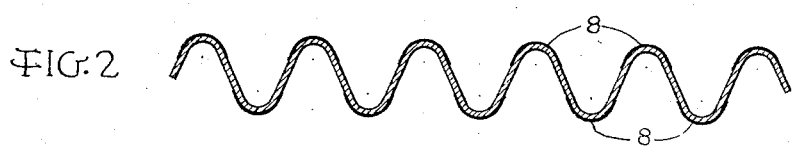
FIGURE 2 is another view of a core component of the structure of FIGURE 1, having a layer of a braze metal preformed thereon.

FIGURE 2 illustrates a convenient method of providing for the interposition of brazed material. The corrugated core component 1 of FIGURE 1 is here depicted in cross-section with a discontinuous coating of a braze metal layer 8 applied thereon in the vicinity of each of the surfaces to be presented to attachment positions in a structure. The braze metal may be any conventional brazing material—copper, silver, or a eutectic alloy—having a fusion temperature substantially below that of the structural material. The thickness and extent of a brazed metal layer 8 is chosen according to the volume of material required to provide a fillet of a desired size. Alternatively, the layer may be continuous over the entire surface of a component, as a separate foil or as an adherent coating produced by electrodeposition, spraying of a molten metal, or by any other conventional means.

Figures 3, 4:
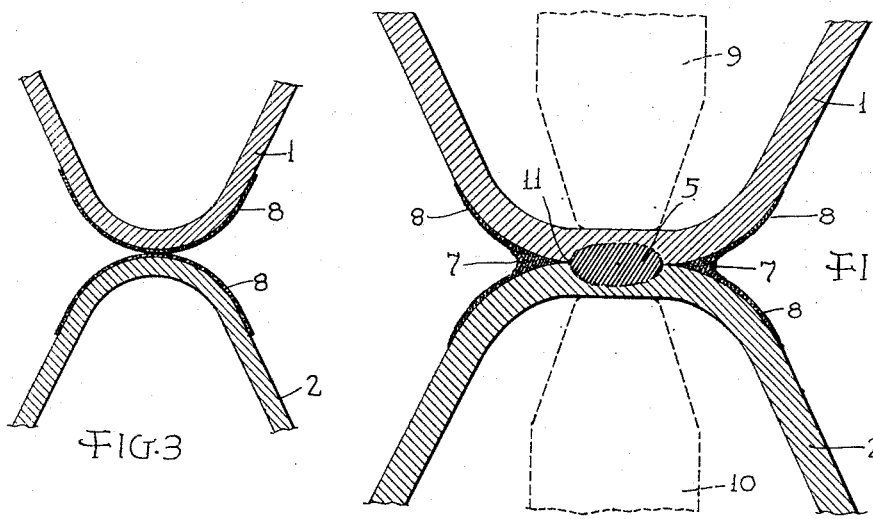
FIGURE 3 is a view of corrugated sheet metal components in position with interposed brazing material before joining.
FIGURE 4 illustrates the application of conventional welding apparatus according to the method of this invention.

FIGURE 3 illustrates the juxtaposition of structure components 1, 2 and brazing metal, here shown as a layer 8 on both contiguous components. Before heating, there is no contact of the components 1 and 2 and there is a considerable volume of the brazing material to be displaced before such contact takes place. The volume of the final fillet is derived both from the displaced material and from additional material flowing from areas outside of the attachment position under capillary and surface tension effects.

In FIGURE 4, resistance welding electrodes 9 and 10 are indicated at their operative positions whereby an electric current is passed across a welding position therebetween and back-up pressure is maintained urging the components 1 and 2 into contact. Upon fusion and expulsion of the braze material, the continued application of welding current will cause formation of the weld nugget 5, the primary bond between components 1 and 2. The concurrent additional bond of the brazed metal fillet 7 greatly increases the total attachment area. Further, the presence of the brazed fillet surface alleviates stress concentrations, which ordinarily exist at points 11 at the periphery of the weld nugget bond.

It should be understood that the formation of the weld nugget bond and the formation of the brazing material fillet bond are concurrent. The term concurrent, as used herein, denotes that both parts of the composite bond are accomplished during a single heating-cooling cycle at an attachment position. Further, the method is generally applicable with autogenous welding means, other than the preferred resistance welding apparatus, including arc-spot welding equipment and the like.

Figures 5, 6:
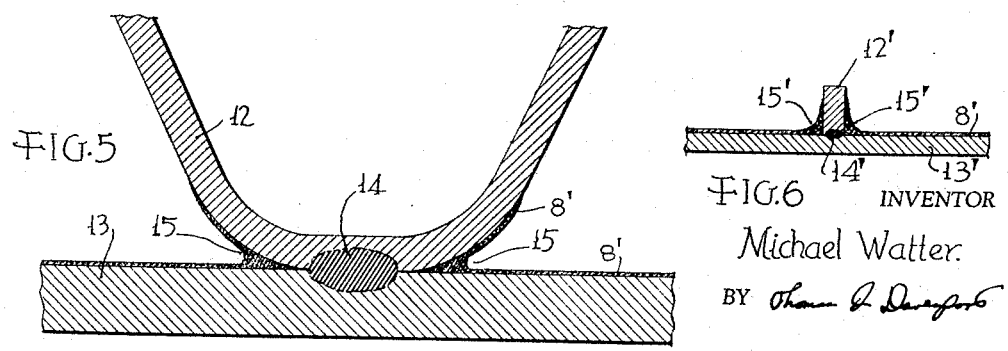
FIGURE 5 illustrates a curved component joined with a planar component according to this invention.
FIGURE 6 illustrates the composite attachment between normally abutting components.

FIGURE 5 is an enlarged cross-sectional view at an attachment position on the panel of FIGURE 1 where the faying surface area is between a planar component 13 and a curved component 12. It will be apparent that the lateral extent of the weld nugget 14 is limited by the width of the faying surfaces. Any further enlargement of the weld nugget 14 would result in weld splash or spit, the extrusion of molten parent metal. However, the concurrent formation of the braze fillet 15 from fusion of brazing material layer 8' provides properties similar to those provided for a weld nugget having a lateral dimension greater than that of the faying surfaces.

While the foregoing illustrations have been of a specific sandwich structure panel fabrication, it is to be understood that application of the method of this invention is not restricted thereto. Other applications include the example of FIGURE 6, wherein a normal component 12' is attached to a planar component 13' by means of the concurrently formed weld nugget 14' and fused material fillets 15', 15'. This configuration may be considered an extreme case of the attachment sheet metal components, having narrow faying surfaces and mutually divergent major surfaces.

It will be obvious to those skilled in the art that various changes and modifications may be made in the illustrated embodiments, without departing from this invention, and it is, therefore, aimed in the appended claims to cover all such changes and modifications as fall within the true spirit and scope of the invention.

What is claimed is:

1. The method for joining cylindrical core and planar skin sheet metal sandwich structure components along a tangential faying surface at which at least one of the components is substantially curved, which method comprises the steps of interposing between a cylindrical core component and an adjacent component a layer of a brazing material having a fusion temperature substantially less than that of the components, applying welding pressure urging the components together and enforcing contact between the components and the brazing material at a joining position, passing a welding current through the joining position fusing the braze material and subsequently forming a weld nugget between the components within the fused brazed metal, interrupting the supply of welding current while maintaining welding pressure, solidifying the fused brazed metal into a fillet about the weld nugget, and thereafter removing the welding pressure.

2. The method for joining cylindrical core and planar skin sheet metal sandwich structure components along tangential faying surfaces which method comprises the steps of interposing between a cylindrical core component and an adjacent component a layer of a brazing material having a fusion temperature substantially less than that of the components, applying welding pressure urging the components together and enforcing contact between the components and the brazing material at a joining position, creating a temperature gradient at the joining position by applying heat thereto sufficient to form a weld nugget between the components, fusing the braze material and fusing a weld nugget thereafter between the components, cooling the components to solidify the weld nugget, and cooling the brazed material to solidify the fused brazed material into a fillet about the weld nugget whereby a composite attachment of a weld nugget bond and a brazed fillet is formed concurrently at an attachment position.

References Cited in the file of this patent

UNITED STATES PATENTS

| | | |
|---|---|---|
| 2,481,626 | Schryber | Sept. 13, 1949 |
| 2,881,304 | Dobson et al. | Apr. 7, 1949 |
| 2,902,589 | Wirta | Sept. 1, 1959 |